May 22, 1928.
A. J. RECHLIN
1,670,482
JUICE FILTER
Filed June 17, 1927
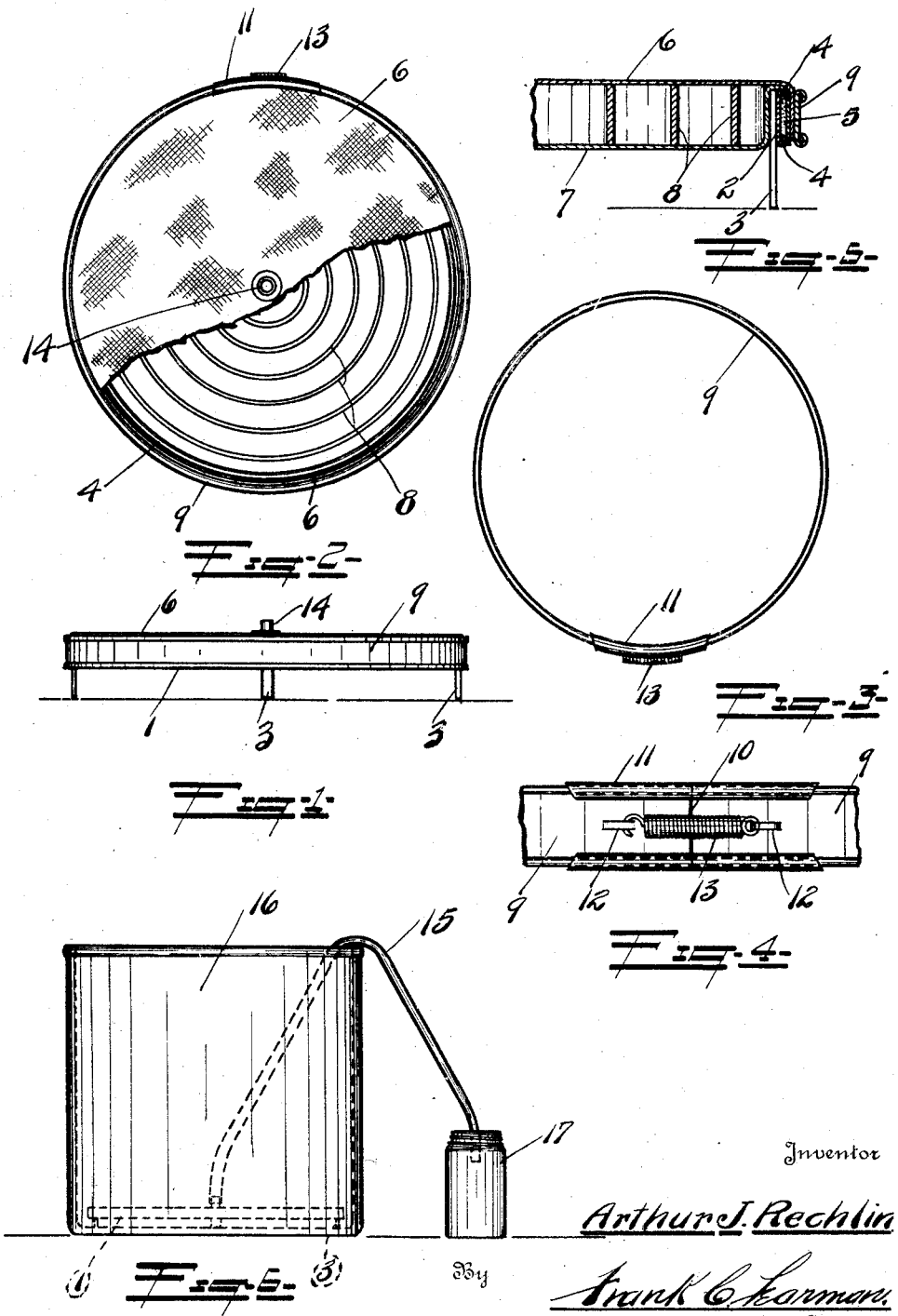
Inventor
Arthur J. Rechlin
By Frank C. Farman
Attorney Patented May 22, 1928.

1,670,482

UNITED STATES PATENT OFFICE.

ARTHUR J. RECHLIN, OF BAY CITY, MICHIGAN.

JUICE FILTER.

Application filed June 17, 1927. Serial No. 199,508.

This invention relates to filters and more particularly to a household filter for use in filtering fruit juices, jellies, water, and other liquids requiring similar treatment.

The prime object of the invention is to design a simple and inexpensive filter, which can be placed in an open receptacle, and which will have a maximum filtering capacity.

Another object is to design a filter which can be easily assembled and cleaned, and on which the filter cloths can be readily replaced.

With the above and other objects in view, the present invention consists in the combination and arrangement of parts, hereinafter more fully described, illustrated in the accompanying drawing, and particularly pointed out in the appended claims, it being understood that the changes may be made in the form, size, proportion and minor details of construction, without departing from the spirit, or sacrificing any of the advantages of the invention.

In the drawings.

Fig. 1 is an edge view of my improved filter.

Fig. 2 is a top plan view thereof, the top filter cloth being broken away to show the spacing coil or member.

Fig. 3 is a plan view of the outer expandable ring.

Fig. 4 is an enlarged fragmentary side view showing the expansion joint.

Fig. 5 is an enlarged fragmentary sectional view through the rim.

Fig. 6 is a view showing the filter assembled, and in position in a suitable receptacle.

Referring now particularly to the drawing, the numeral 1 indicates the frame or support on which the filter is mounted, and comprises a circumferential ring or band member 2, having spaced apart legs 3 suitably secured thereto, the metal of which the ring is formed having its edges turned to form beads 4, and a cork filler ring 5 is inserted between the beads, filling the space therebetween, and forming a rough surface to which the filter cloth will cling.

The filtering element comprises spaced apart top and bottom filter cloths 6 and 7, a spirally wound strip of metal 8 being placed on the bottom cloth and serves to space the cloths from each other, eliminating the possibility of the cloth sagging together and forming a dead section in the filtering area.

The filter cloths are shaped to fit the frame and are of a size to lap over the top edge of the member 2, as clearly shown in Fig. 5 of the drawing, and an expandable ring 9 is placed over this ring 2 and the overlapping edges of the filter cloths, thereby securing them between the rings and preventing displacement thereof. This expansion ring can be of any suitable design, and in the present instance I have shown the ring split as at 10, the ends being inserated in a short section 11, the top and bottom edges of which are rolled, and embrace the beaded edges of the ring, so that they may freely slide therein. The metal directly adjacent the ends of the ring being punched as shown at 12 to provide an anchorage for the coiled spring 13, thereby providing a resilient expandable connection.

The top filter cloth is provided with a centrally disposed grummet 14, having an upstanding nipple to which a length of hose 15 is attached, all as clearly shown in Fig. 6 of the drawing. In practice the filter is placed in a receptacle 16, into which the juice or liquid to be filtered is placed, the hose leading over and into a suitable can or receptacle 17 placed adjacent thereto.

From the foregoing description it will be obvious that I have perfected a very simple, inexpensive, and convenient household filter, which can be easily assembled, operated and cleaned.

What I claim is:—

1. A filter comprising a frame having legs thereon, spaced apart filter cloths, means for spacing said cloths from each other, and means for clamping the filter cloth to said frame.

2. A filter comprising a circumferential frame provided with legs, spaced apart filter cloths stretched over said frame, and an expandable ring engaging the edges of said filter cloths for clamping them to said frame.

3. A filter comprising a circumferential beaded ring having legs secured thereto, and provided with a cork filler, spaced apart filter cloths covering said ring, and overlapping the edges thereof, and an expandable ring for holding the edges of said filter cloths.

4. A household filter comprising a circumferential ring having a cork filler, legs secured to said ring, filter cloths in said ring, a spirally coiled member interposed between said cloths, the edges of said cloths lapping over the edges of the ring, and resilient expandable member engaging the outer edges of the filter cloths for clamping them to the ring.

5. A filter comprising a circumferential ring having a cork filler, spaced apart legs secured to said ring, top and bottom filter cloths, a spirally wound member interposed between said cloths, the edges of said cloths lapping over the edge of the circumferential ring, an expandable member adapted to be placed over the circumferential ring and wedging the filter cloth edges therebetween, and a discharge connection secured to the top filter cloth.

In testimony whereof I hereunto affix my signature.

ARTHUR J. RECHLIN.